(12) United States Patent
Yoshizawa (10) Patent No.: US 6,928,166 B2
(45) Date of Patent: Aug. 9, 2005

(54) RADIO COMMUNICATION DEVICE AND USER AUTHENTICATION METHOD FOR USE THEREWITH

(75) Inventor: Junichi Yoshizawa, Ome (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 887 days.

(21) Appl. No.: 09/795,355

(22) Filed: Mar. 1, 2001

(65) Prior Publication Data

US 2001/0036273 A1 Nov. 1, 2001

(30) Foreign Application Priority Data

Apr. 28, 2000 (JP) ........................................ 2000-131861

(51) Int. Cl.[7] .............................. H04K 1/00; H04L 9/16
(52) U.S. Cl. ........................ 380/247; 380/255; 713/168
(58) Field of Search ................................ 380/247, 270, 380/255; 713/168, 169, 171, 201

(56) References Cited

U.S. PATENT DOCUMENTS

| | | | |
|---|---|---|---|
| 5,442,805 A | | 8/1995 | Sagers et al. |
| 6,748,195 B1 | * | 6/2004 | Phillips ...................... 455/41.2 |
| 6,766,160 B1 | * | 7/2004 | Lemilainen et al. ......... 455/411 |
| 2002/0132605 A1 | * | 9/2002 | Smeets et al. ............... 455/411 |
| 2004/0128509 A1 | * | 7/2004 | Gehrmann .................. 713/171 |

FOREIGN PATENT DOCUMENTS

| | | | | |
|---|---|---|---|---|
| EP | WO 97/26769 | | 7/1997 | |
| EP | WO 01/74011 A1 | | 10/2001 | |
| GB | 2350971 A | * | 12/2000 | ............. G06F/1/00 |
| JP | 09-233223 | | 9/1997 | |
| JP | 2872996 | | 1/1999 | |

OTHER PUBLICATIONS

Johannes Elg, "Specification of the Bluetooth System," ver. 1.0 B, pp. 186–199, Nov. 29, 1999.
English abstract of JP 11-275661 published Oct. 8, 1999.

* cited by examiner

*Primary Examiner*—Matthew Smithers
(74) *Attorney, Agent, or Firm*—Finnegan, Henderson, Farabow, Garrett & Dunner, L.L.P.

(57) ABSTRACT

To allow flexible security level switching according communication situations, a password holding section holds a plurality of device authentication passwords, for example, a temporary password and a private password. The temporary password is valid only under a certain situation and the private password has a high level of confidentiality to increase the device security. A password management section allows the user to add a new password to the password holding section and delete an existing password therefrom. A password selecting section selects the most suitable password for current connection from among passwords in the password holding section according to a user event, information acquired by an external factor acquisition section, and information from a time control section. The selected password is output to a password checking section.

19 Claims, 5 Drawing Sheets

| UNIQUE ADDRESS (Hex) | LINK KEY |
|---|---|
| A36B35 | ****** |
| 4B3346 | ****** |
| ..... | ..... |

RADIO COMMUNICATION DEVICE AND USER AUTHENTICATION METHOD FOR USE THEREWITH

CROSS-REFERENCE TO RELATED APPLICATIONS

This application is based upon and claims the benefit of priority from the prior Japanese Patent Application No. 2000-131861, filed Apr. 28, 2000, the entire contents of which are incorporated herein by reference.

BACKGROUND OF THE INVENTION

The present invention relates to a radio communication device and a user authentication method using user authentication passwords.

In recent years, attention has been paid to radio communication systems adapted for personal areas, such IrDA, Bluetooth, HomeRF, etc. Particularly, Bluetooth and HomeRF have merits of no directivity and high transparence over infrared communication systems, such as IrDA, and are greatly expected to develop and find wide application in the future. The Bluetooth is short-haul radio communication standards and establishes radio communications within 10 m or 100 m using the ISM (Industrial Science Medical) band of 2.4 GHz band. The Bluetooth adopts frequency-hopping spectrum-spreading techniques and allows for connection of up to eight devices through the use of time-division multiplexing techniques.

In addition to allowance for simultaneous connection of multiple devices, the radio communication systems, such as Bluetooth, HomeRF, etc., make a great feature of a relatively long transmission distance of, say, 10 to 100 m in comparison with the infrared communication systems, such as IrDA. This provides an advantage of ease of handling, but on the other hand sufficient attention must be paid to assure system security and confidentiality.

Conventional security systems for radio communication systems include the radio terminal security system as described in Japanese Patent No. 2872996 and the one-time password system as used in the Internet.

These security systems include electronic keys and radio terminals and prohibit successive use of the same key to increase security, thereby providing increased safety against loss and theft of the key.

Next, the user authentication system used in the Bluetooth will be described.

The user authentication system used in the Bluetooth is subject to two: a unique password set up on each device (called a PIN (Personal Identification Number) code) and an encryption key (called link key) created by the password and an ID code unique to the device (information, such as a 48-bit address, assigned by IEEE). This system will be described in brief below with reference to a flowchart shown in FIG. 7.

Figure 7:
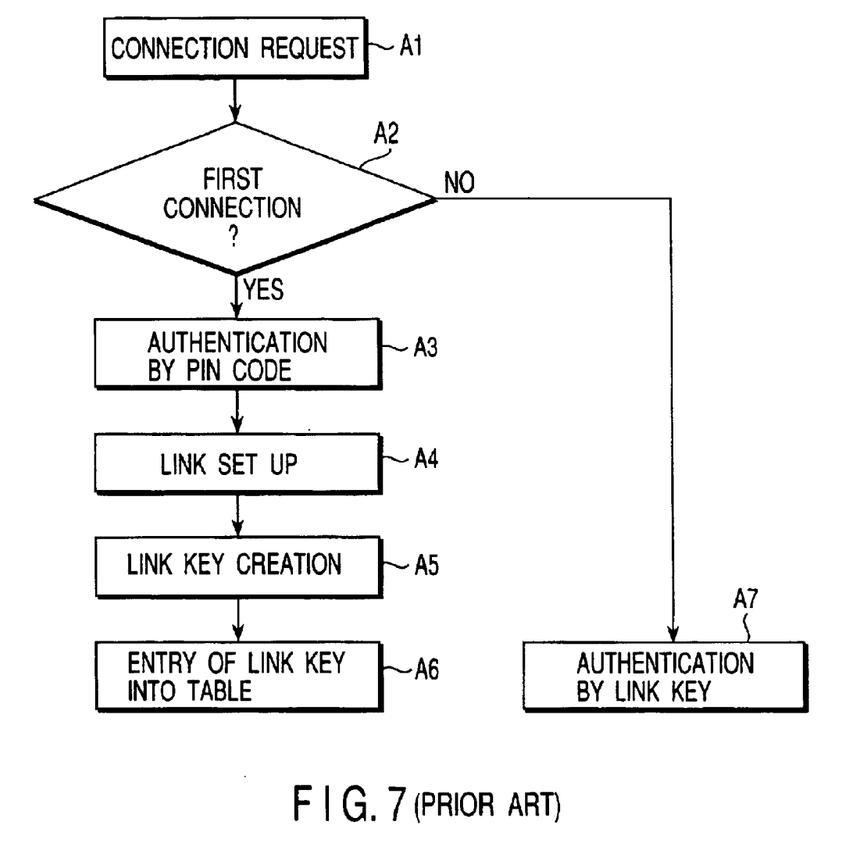
FIG. 7 is a flowchart for user authentication in the Bluetooth system.
Figure 8:
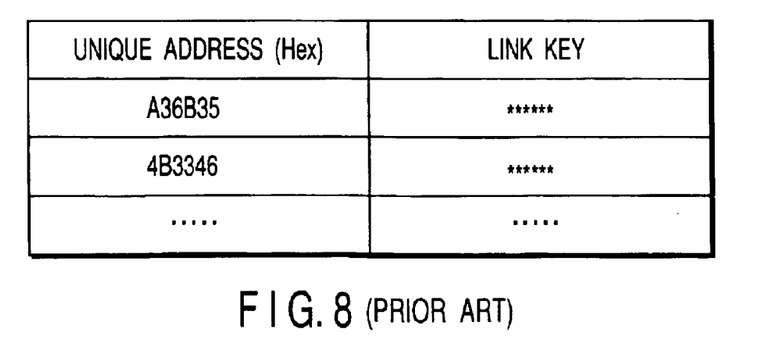
FIG. 8 shows the contents of the table used in the user authentication processing shown in FIG. 7.

Consider now the case where a device A makes access to a device B. The device A makes a request for connection to the device B (step A1), whereupon the device B checks the presence or absence of the link key to see if the connection to the device A is set up for the first time (step A2). That is, the device B is stored with a list of link keys besides PIN codes. This list is a table of unique addresses of devices connected so far to the device B and corresponding link keys. An example of this table is illustrated in FIG. 8.

In the situation in which the device A and the device B are connected for the first time, the device A is required to input the PIN code of the device B. Upon receiving the PIN code from the device A, the device B checks it for validity (step A3). If the PIN code is authenticated, then the device B establishes a link (step A4) and creates a link key for the device A (step A5). The resulting link key is entered into the list together with the unique address of the device A (step A6).

If, on the other hand, the device A was sometimes connected to the device B in the past, since the link key has already been entered into the table in the device B, authentication is made through that link key (step A7).

The Bluetooth provides authentication using the PIN code unique to each device and the link key based on the PIN code. The PIN code, while being unique, can be altered by the device user into any other string of characters.

The security system disclosed in Japanese Patent No. 2872996, the one-time password system in the Internet and the user authentication system in the Bluetooth can be said to be password management and authentication systems intended to provide only increased security.

The use of the user authentication system in ad hoc network environment causes problems as described below.

As an application of the user authentication system used in the Bluetooth, consider a table conferencing system made up of a plurality of information devices. Each individual device is required to establish a fiduciary relationship based on the above user authentication system with the others.

However, in order for each individual user having his own private PIN code to ensure the security of his own device, it is desirable to adopt a method involving creating a temporary PIN code and changing it to the original private PIN code at the termination of the table conferencing rather than establishing the fiduciary relationship by informing the other users of the private PIN code.

To adopt the user authentication system as described above, therefore, it is required to take the following steps:

S1: Each individual user sets up a temporary PIN code on his own device and informs the other users of that PIN code.

S2: Holds table conferencing.

S3: At the termination of the conferencing, each individual user makes a change from the temporary PIN code to his original private PIN code.

With the above approach, however, not only does it take long to set up the PIN code, but also the security level is considerably lowered in the event that the user forgot to make a change from the PIN code to the original PIN code; for, in such case, the temporary PIN code will come to be used successively.

BRIEF SUMMARY OF THE INVENTION

It is therefore an object of the present invention to provide a radio communication device and a user authentication method for use therewith which permit the security level to be changed with flexibility according to communication situations without imposing any operating burden on users.

According to one aspect of the present invention, there is provided an authentication processing apparatus of a radio communication which authenticates a device, the apparatus comprising: means for selecting a security level from a plurality of security levels in accordance with a condition of the radio communication;

means for receiving a request for an authentication and authentication information from the device; means for checking whether the received information from the device is valid or not depending on the selected security level; and means for sending a response of the check result which authenticates or rejects the device thereto.

According to another aspect of the present invention, there is provided a radio communication device having a password unique to it and adapted for authenticating another device by use of the password, comprising: password holding means for holding at least a first password intended for temporary use and a second password intended for regular use; password selecting means for selecting an appropriate password from the password holding means according to a current communication condition; and password checking means for checking a password sent from another device with the password selected by the password selecting means to thereby authenticate the another device.

According to still another aspect of the present invention, there is provided a n authentication processing method of a radio communication which authenticates a device, the method comprising the steps of: selecting a security level from a plurality of security levels in accordance with a condition of the radio communication; receiving a request for an authentication from the device; receiving authentication information from the device; checking whether the received information from the device is valid or not depending on the selected security level; and sending a response of the check result which authenticates or rejects the device thereto.

According to still another aspect of the present invention, there is provided a radio communication method communicating with a device, the method comprising the steps of: storing a first password intended for temporary use and a second password intended for regular use; selecting the first password depending on a variable security level; receiving a request for a connection from the device; receiving a password for an authentication from the device; checking whether the received password from the device and the selected first password correspond or not; sending a response of the check result which authenticates or rejects the device thereto; performing a low-security-level communication with the authenticated device based on the connection; and changing over, when the communication is terminated, the security level to higher one than that of the first password and selecting the second password.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Figure 1:
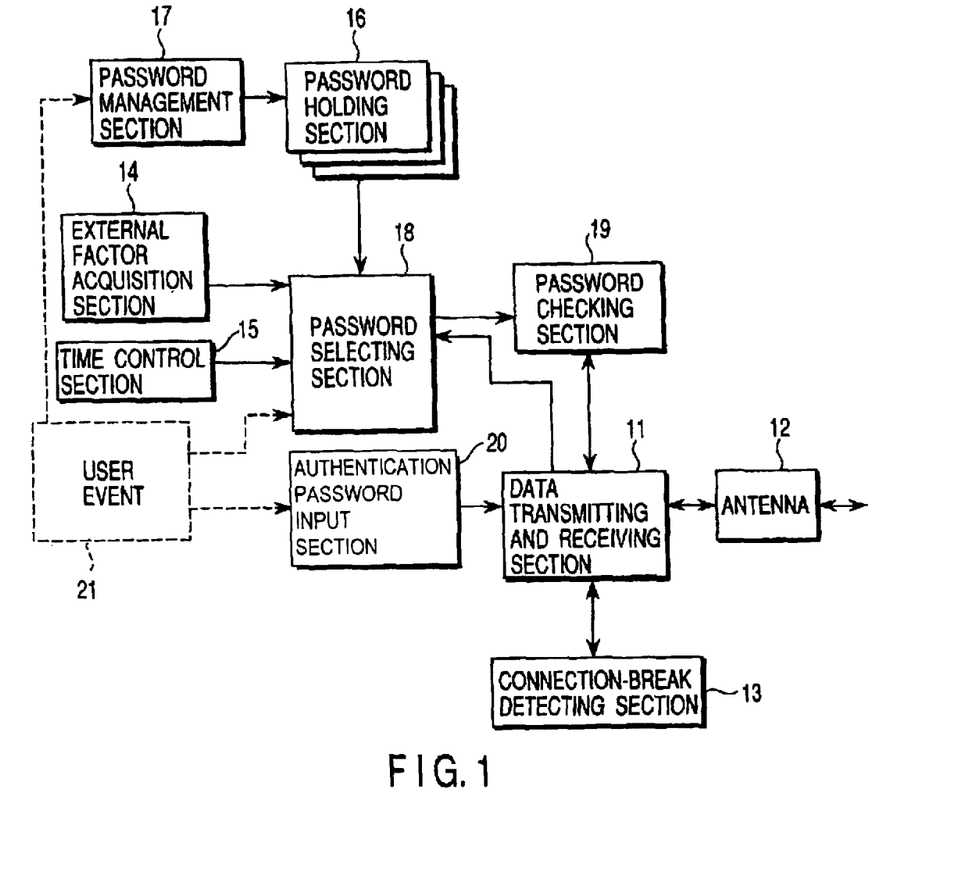
FIG. 1 is a block diagram of a radio communication device according to an embodiment of the present invention.

FIG. 1 is a block diagram of a radio communication device according to an embodiment of the present invention, which comprises a data transmitting and receiving section 11, an antenna 12, a connection-break detecting section 13, an external factor acquisition section 14, a time control section 15, a password holding section, a password management section 17, a password selecting section, a password checking section 19, and an authentication password input section 20. User events 21 are applied to the password management section 17, the password selecting section 18, and the authentication password input section 20.

The data transmitting and receiving section 11 makes radio communication with other devices through the antenna 12, performs low-level framing and synchronous processing, and can perform error detection and correction as required.

The connection-break detecting section 13 examines data receiving conditions in the data transmitting and receiving section 11 to detect whether the device with which the connection has been set up lies outside the coverage area and presents the result to the password selecting section 18. The connection-break detecting section 13 is also configured to allow the user to set arbitrarily parameters, such as timer values, receiving sensitivity, etc., for recognizing connection break, that is, to set optimum values so that the password is not readily switched to another one in the event of bad data receiving conditions. Although, in FIG. 1, the connection-break detecting section 13 is provided independently, it may be incorporated into the external factor acquisition section 14.

The external factor acquisition section 14 identifies external factors, for example, the presence or absence of AC power supply, the presence or absence of wireless connection, such as Bluetooth, IrDA, etc., or wired connection, such as USB, IEEE1394, etc., and controls the password selecting section 18 correspondingly.

The time control section 15 controls time information in terms of absolute time or relative time and, at the occurrence of timer runout, notifies the password selecting section 18 of it.

The password holding section 16 is a memory that stores a plurality of passwords for authenticating the device (e.g., two passwords: a temporary password and a private password). The temporary password is one which is valid only during the duration of connection with a certain device and intended for temporary use, whereas the private password is one which ensures high confidentiality to increase the security of the device and is intended for regular use. The password management section 17 is adapted to add new passwords to the contents of the password holding section 16 or deleting existing passwords therefrom according to events 21 from the user.

The password selecting section 18 selects the most suitable password for current connection from among the passwords stored in the password holding section 16 according to the user events 21, information acquired by the external factor acquisition section 14, and information from the time control section 15 and sends it to the password checking section 19. The password selecting section is configured to be able to establish priority among the user event 21, the external factor acquisition section 14, and the time control section 15.

When operating on an external factor acquired by the external factor acquisition section 14, the password selecting section 18 carries out a password changing operation dependent on the external factor, as follows:

(a) In the absence of AC power supply, i.e., when the device is battery-powered, the device is recognized as being in the mobile environment and hence the private password is chosen.

(b) When a cable is connected, the device is recognized as being in the indoor environment and as a result the temporary password is chosen.

(c) When no radio carrier signal is received from a server, the device is recognized as having moved from the office to the outside, in which case the private password is chosen.

The password checking section 19 checks the password determined by the password selecting section 18 with an authentication password sent from a person with which the connection has been set up, thus implementing appropriate user authentication. The authentication password input section 20 enters the authentication password into the data transmitting and receiving section 11 according to the user event 21.

Next, the authentication operation according to the present embodiment will be described.

Figure 2:
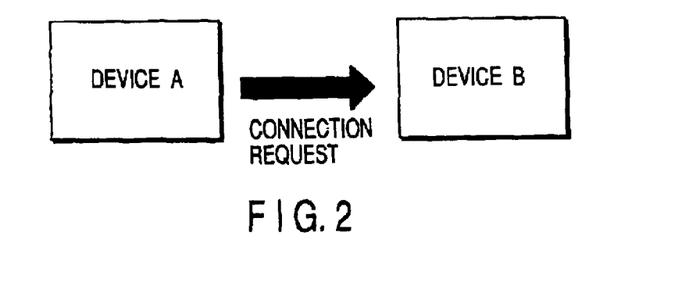
FIG. 2 is a diagram for use in explanation of device-to-device communication in the embodiment.

Suppose now that devices A and B are about to be connected together as shown in FIG. 2. In this case, the authentication procedure is performed when the device A enters the authentication password for the device B.

Figure 3:
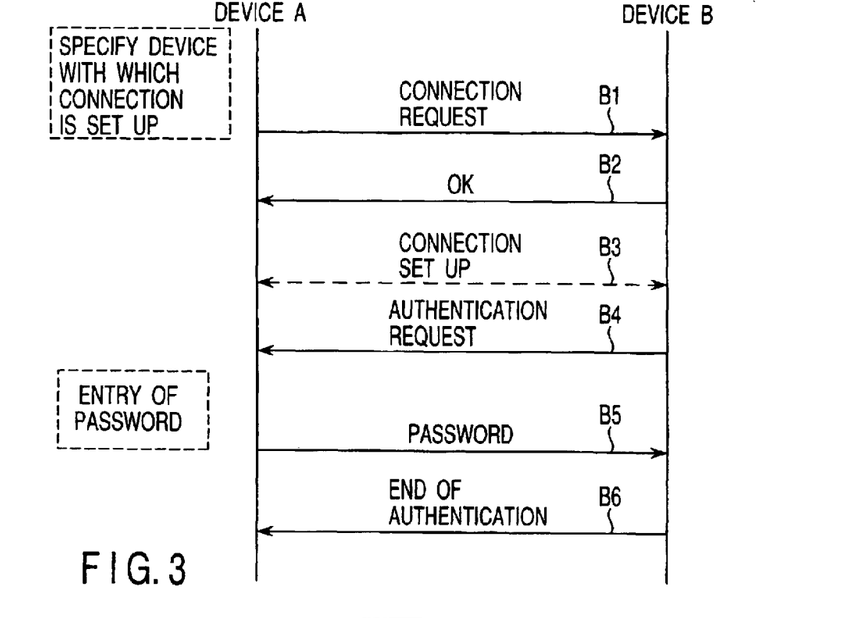
FIG. 3 illustrates the flow of processing from a request for connection to the completion of authentication in the embodiment.

As shown in FIG. 3, first, the user at the device A makes a request for connection. In response to this, the data transmitting and receiving section 11 in the device A issues a request for connection and transmits information from the antenna 12 (step B1).

Upon receiving the connection request from the device A, the data transmitting and receiving section 11 in the device B examines the received data and, in the case of no problem, sends a message to establish connection to the device A(step B2). After that, the connection is set up between the devices A and B (step B3). The connection in this case means the connection in low-level layer (e.g., the situation in which a virtual network address has been set up) and does not necessarily means high application services.

After the connection has been set up, the authentication procedure on the password is carried out. That is, the device B upon setting up the connection issues a request for authentication to the device A and prompts it to enter a password (step B4). In response to this, the user at the device A enters the password to the device B from the password input section 20 into the data transmitting and receiving section 11 for transmission to the device B (step B5).

Upon receipt of the password, the device B checks it with an authentication password chosen by the password selecting section 18. If the result indicates that the received password is improper, then the device B sends to the device A a message to the effect that the password is incorrect. If, on the other hand, the received password is correct, then the user authentication procedure comes to an end (step B6).

In the user authentication procedure, each individual user generally uses an authentication password having much increased confidentiality, thereby providing increased security for his own device. However, in applications of highly ad hoc nature, such as table conferencing, card exchange, etc., an easy-to-handle environment may be expected to be built up even if the security for devices is lowered temporarily. The procedure for implementing such an environment will be described below.

Consider now the case of card exchange with a complete stranger in a card exchange application installed in personal digital assistants (PDAs). In this case as well, user authentication is performed between the devices A and B.

The user at the device B generally uses a private password having much increased confidentiality as the authentication password so as to increase the security for his own device. However, to inform a stranger of the private password in such a situation as in this example is not desirable from the viewpoint of security. For this reason, the user at the device B sets up such a password (temporary password) as is valid only while the connection with the device A is set up and uses the temporary password for user authentication.

Figure 4:
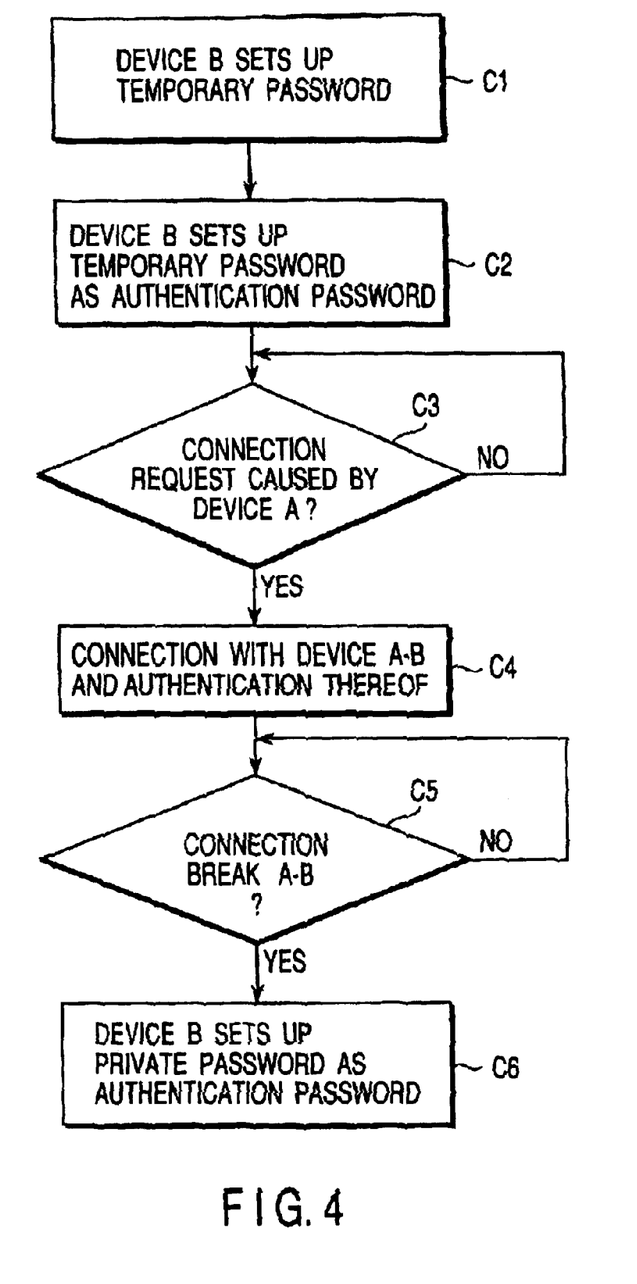
FIG. 4 is a flowchart for switching between a temporary password and a private password in the embodiment.

The switching control between the private password and the temporary password (security level control) will be described below with reference to a flowchart illustrated in FIG. 4.

The user at the device B issues a command which is based on the event 21 to the password selecting section 18 (step C1) and then sets up the temporary password as the authentication password (step C2). After that, the device B is placed in the wait state until a connection request is generated from the device A (step C3). The temporary password is very simple one (e.g., "ABC") as compared with the private password and presented to the user at the device A. In an extreme case, communication could be made between the devices A and B with no password. Making the temporary password simple as described above will make it possible to notify the user at the device A of the temporary password orally. Additionally, the temporary password may be sent to the device A along with electronic mail.

The user at the device A received notification from the device B makes a request to the device for connection and enters the temporary password.

In response to the connection request by the device A, the device B sets up the connection with the device A and then carries out authentication processing on the temporary password. After that, the devices A and B make data communications with each other on the card exchange application.

The device B makes a check for the termination of the card exchange application, i.e., for the break of the connection with the device A (step C5). Upon detecting the break of the connection, the device B negates the validity of the temporary password and makes an automatic change from the temporary password to the private password (step C6).

One method to automatically make a change from the temporary password to the private password is to associate the lifetime of the temporary password with the lifetime of the communication connection as will be described below.

That is, in FIG. 1, at the time of a break of the connection set up with the current temporary password the connection break detecting section 13 notifies the password selecting section 18 that the connection has been broken. The password selecting section then makes a change from the currently selected password to the private password.

The temporary password may be associated with time information using the time control section 15 rather than with the connection. In this case, a timer value for the temporary password can be freely set by the user in the time control section 15. For example, if there is a two-hour conference, then the temporary password is used for two hours and changed to the private password two hours later.

Figure 5:
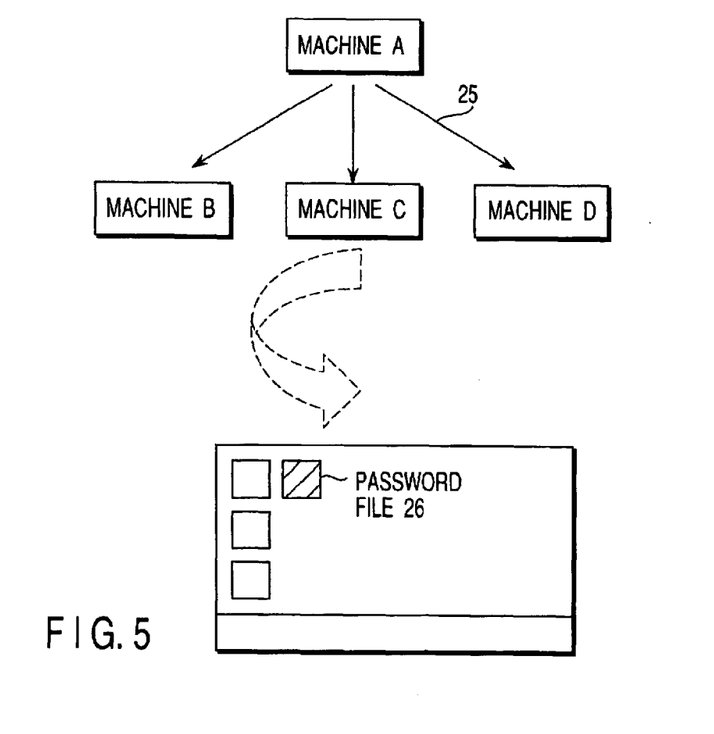
FIG. 5 is a diagram for use in explanation of how conferencing passwords are selected in an electronic conferencing system.

A password which is to be made valid at present is usually chosen by the user through the graphical user interface (GUI). Alternatively, the password may be chosen by an operation of double clicking a password file. For example, in using an application such as an electronic conferencing system, a method can be utilized by which a password file 26 storing information used for selecting a conferencing password is distributed beforehand from a device A to other devices B, C and D over a communication path such as for electronic mail 25 and conference participants are allowed to choose a conferencing password by merely double clicking the file. In this case, the password selecting section 18 chooses a password held in the password holding section 16 according to the information read from the password file 26.

The use of the password file 26 allows an appropriate password to be chosen by a simple operation of double clicking that file with a mouse. Also, the use of the password file allows passwords to be set up without their contents becoming known to the conference participants.

The password file 26 may be stored with passwords themselves rather than password select information. In this case, a password selected from the file may be automatically set up as the authentication password.

The password file 26 may be distributed to devices through electronic mail by radio.

Next, in a radio communication system made up of a plurality of radio communication devices each having the above functions, the management of passwords of the slave devices through ID information of the master device will be described.

Switching is made between authentication passwords in order to, for example, lower the security level of an information device when it is inside an office so that anybody can make access to it and enhance the security level when it is outside the office to prevent access by a third party.

Figure 6:
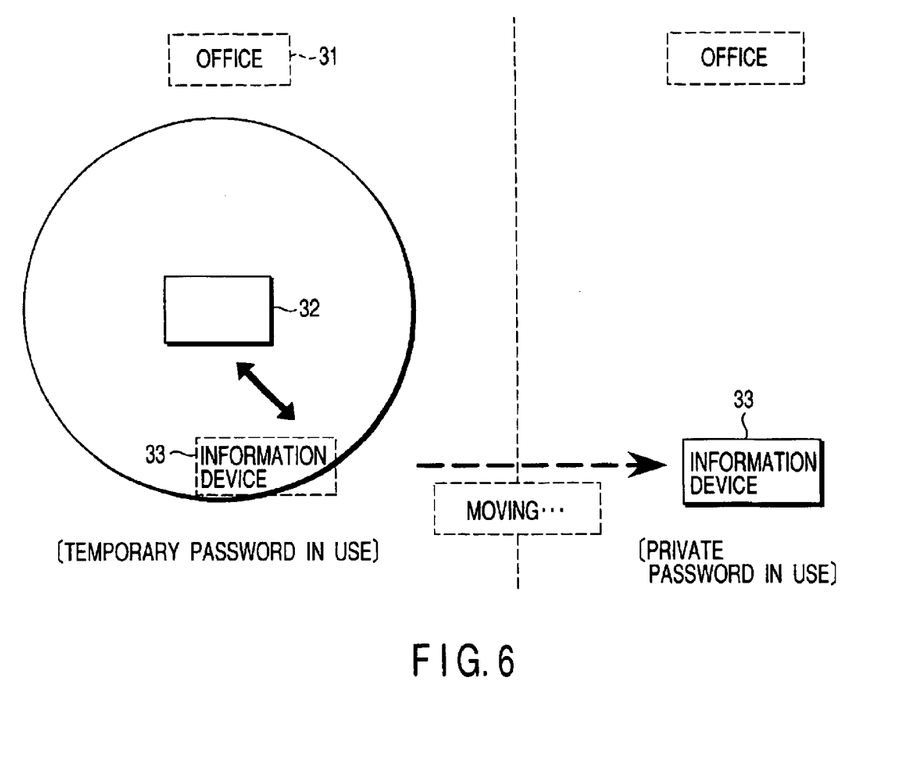
FIG. 6 is a diagram for use in explanation of management of passwords of slave stations through ID information of a master station in a radio communication system composed of multiple radio communication devices.

Specifically, as shown in FIG. 6, a server (master device) 32 for managing the security level is installed in office 31 to detect whether an information device (slave device) 33 stays in the range of connection with the server through its connection break detecting section 13. In the situation where the information device 33 is connected with the server 32, a temporary password (or no password) is selected. In the situation where the connection with the server is broken, the private password is chosen.

The above configuration causes the server 32 to act as the key to password switching.

Although the embodiment has been described in terms of one-way authentication between the devices A and B, mutual authentication is also possible.

According to the present invention, as described in detail above, a radio communication device adapted to perform a authentication procedure on another device using its unique address is configured to hold at least two separate passwords of a temporary password and a private password and make a choice from the two passwords for the procedure of authenticating the other device according to the current communication situations. Accordingly, depending upon what application is used, an appropriate password can be used for authentication and an easy-to-handle communication environment can be implemented in which a high level of security can be maintained at the time of usual communication and the security level can be lowered at the time of temporary communication.

Moreover, the inventive device is configured to usually choose the private password as authentication password, use the temporary password at the time of occurrence of a request by a user at another device for authentication thereof, and reuse the private password after the connection set up by the authentication procedure using the temporary password has been broken; therefore, there is no need for users to be conscious of a change from the temporary password to the private password.

Furthermore, the inventive device is configured to have external factor acquisition means, choose either of the temporary password and the private password for authentication of another device on the basis of information acquired by the external factor acquisition means; thus, the most suitable password can be automatically chosen according to communication situations.

In addition, the inventive device is configured to acquire position information of the device by external factor acquisition means or connection break detecting means and allow switching between the temporary password and the private password according to the position information; thus, the security level of the device can be changed automatically according to its location.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An authentication processing apparatus of a radio communication which authenticates a device, the apparatus comprising:

means for acquiring an external factor which is associated with a security level;

means for selecting a security level from a plurality of security levels in accordance with the external factor;

means for receiving a request for an authentication and authentication information from the device;

means for checking whether the received information from the device is valid or not depending on the selected security level; and means for sending a response of the check result which authenticates or rejects the device thereto.

2. An authentication processing apparatus according to claim 1, wherein said authentication information includes a PIN (Personal Identification Number) code.

3. An authentication processing apparatus according to claim 2, further comprising means for storing a link-key comprising said PIN code and a unique ID of said device.

4. An authentication processing apparatus according to claim 1, further comprising means for detecting a connection-break from the device and changing over said security level in response to the connection-break.

5. A radio communication device having a password unique to it and adapted for authenticating another device by use of the password, comprising:

password holding means for holding at least a first password intended for temporary use and a second password intended for regular use;

password selecting means for selecting an appropriate password from the password holding means according to a current communication condition; and password checking means for checking a password sent from another device with the password selected by the password selecting means to thereby authenticate the other device.

6. The radio communication device according to claim 5, wherein said password selecting means selects a password according to information from a password file.

7. A radio communication device having a password unique to it and adapted for authenticating another device by use of the password, comprising:

password holding means for holding at least a first password intended for temporary use and a second password intended for regular use;

password management means for entering a new password into the password holding means and deleting an existing password in the password holding means;

password selecting means for selecting an appropriate password from the password holding means according to current communication situations; and password checking means for checking a password sent from another device with the password selected by the password selecting means to thereby authenticate the other device.

8. A radio communication device having a password unique to it and adapted for authenticating another device by use of the password, comprising:

password holding means for holding at least a first password intended for temporary use and a second password intended for regular use;

password selecting means for selecting an appropriate password from the password holding means according to current communication situations;

password checking means for checking a password sent from another device with the password selected by the password selecting means to thereby authenticate the other device; and connection break detecting means for detecting radio communication conditions and, upon detecting a connection break as a result of the device having moved to the outside of a communication service area, notifying the password selecting means of the connection break, the password selecting means usually choosing the second password as an authentication password, using the first password at the time of occurrence of a request by a user at the other device as the authentication password, and reusing the second password after the connection set up by the authentication procedure using the first password has been broken.

9. The radio communication device according to claim 8, wherein the connection break detecting means includes means for setting parameters containing timer values and receiving sensitivity for recognizing the connection break.

10. A radio communication device having a password unique to it and adapted for authenticating another device by use of the password, comprising:

password holding means for holding at least a first password intended for temporary use and a second password intended for regular use;

external factor acquisition means;

password selecting means for selecting an authentication password from the password holding means on the basis of information acquired by the external factor acquisition means; and password checking means for checking a password sent from another device with the password selected by the password selecting means to thereby authenticate the other device.

11. A radio communication device having a password unique to it and adapted for authenticating another device by use of the password, comprising:

password holding means for holding at least a first password intended for temporary use and a second password intended for regular use;

password selecting means for selecting an appropriate password from the password holding means according to current communication situations;

password checking means for checking a password sent from another device with the password selected by the password selecting means to thereby authenticate the other device; and time control means for counting time to provide management information on a set time to the password selecting means, the password selecting means usually choosing the second password as an authentication password, using the first password at the time of occurrence of a request by a user at the other device as the authentication password, and setting the second password as the authentication password at the expiration of the time set by the time management means.

12. A radio communication device having a password unique to it and adapted for authenticating another device by use of the password, comprising:

password holding means for holding at least a first password intended for temporary use and a second password intended for regular use;

password selecting means for selecting an appropriate password from the password holding means according to current communication situations; and password checking means for checking a password sent from another device with the password selected by the password selecting means to thereby authenticate the other device, each of the devices acting as slave stations recognizing information unique to a master station, selecting one of the first and second passwords in a state where it can communicate with the master station, and selecting the other password in a state where it cannot communicate with the master station.

13. An authentication processing method of a radio communication which authenticates a device, the method comprising:

selecting a security level from a plurality of security levels in accordance with a condition of the radio communication;

receiving a request for an authentication from the device;

receiving authentication information from the device;

checking whether the received information from the device is valid or not depending on the selected security level; and sending a response of the check result which authenticates or rejects the device thereto.

14. An authentication processing method according to claim 13, wherein said authentication information includes a PIN (Personal Identification Number) code.

15. An authentication processing method according to claim 14, further comprising the step of storing a link-key comprising said PIN code and a unique ID of said device.

16. An authentication processing method according to claim 13, further comprising the step of acquiring an external factor which is associated with said security level.

17. A radio communication method communicating with a device, the method comprising:

storing a first password intended for temporary use and a second password intended for regular use;

acquiring an external factor which is associated with a variable security level;

selecting the first password depending on a variable security level;

receiving a request for a connection from the device;

receiving a password for an authentication from the device;

checking whether the received password from the device and the selected first password correspond or not;

sending a response of the check result which authenticates or rejects the device thereto;

performing a low-security-level communication with the authenticated device based on the connection; and changing over, when the communication is terminated, said security level to a higher one than that of said first password and selecting said second password.

18. A radio communication method according to claim 17, wherein said second password includes a PIN (Personal Identification Number) code.

19. A radio communication method according to claim 18, further comprising the step of storing a link-key comprising said PIN code and a unique ID of said device.

* * * * *